United States Patent
Yahil

(10) Patent No.: US 8,503,811 B2
(45) Date of Patent: Aug. 6, 2013

(54) FILTERS FOR DENOISING DIGITAL IMAGES WITH MINIMIZED BLUR AND SHAPE DISTORTION AND CONTROLLED DEBLURRING

(75) Inventor: Amos Yahil, Stony Brook, NY (US)

(73) Assignee: ImageRecon LLC, Stony Brook, NY (US)

( * ) Notice: Subject to any disclaimer, the term of this patent is extended or adjusted under 35 U.S.C. 154(b) by 1487 days.

(21) Appl. No.: 11/753,548

(22) Filed: May 24, 2007

(65) Prior Publication Data

US 2007/0274605 A1   Nov. 29, 2007

Related U.S. Application Data

(60) Provisional application No. 60/808,439, filed on May 24, 2006.

(51) Int. Cl.
*G06K 9/40* (2006.01)

(52) U.S. Cl.
USPC ............... 382/260; 382/275; 382/280

(58) Field of Classification Search
USPC .......................... 382/260, 275, 280
See application file for complete search history.

(56) References Cited

U.S. PATENT DOCUMENTS

| | | | |
|---|---|---|---|
| 5,438,374 A | | 8/1995 | Yan |
| 5,818,964 A | * | 10/1998 | Itoh ............... 382/205 |
| 6,993,204 B1 | | 1/2006 | Yahil |
| 2006/0070256 A1 | | 4/2006 | Weissman et al. |
| 2006/0290821 A1 | | 12/2006 | Soupliotis et al. |

FOREIGN PATENT DOCUMENTS

| | | |
|---|---|---|
| EP | 0601655 A1 | 6/1994 |
| JP | 06046298 A | 2/1994 |

OTHER PUBLICATIONS

Linda Shapiro and George Stockman, Computer Vision, Prentice Hall 2001.*
Weishi Xia, Fourier Correction for Spatially Variant Collimator Blurring in SPECT, IEEE 1995.*
International Search Report and Written Opinion in PCT/US07/69696 dated Nov. 20, 2007.
Puetter RD, Gosnell GR, Yahil A. 2005. "Digital image reconstruction: deblurring and denoising", Annu. Rev. Astron. Astrophys, 43:139-194.

(Continued)

*Primary Examiner* — Chan S Park
*Assistant Examiner* — Mark Roz
(74) *Attorney, Agent, or Firm* — Eleanor M. Musick; Procopio, Cory, Hargreaves & Savitch LLP

(57) ABSTRACT

A curvature-preserving filter having a null covariance matrix is applied to an input image to produce a denoised output image for output to a graphic display device or to a machine analysis tool. In one embodiment, the input image is a small kernel consisting of a limited number of pixels and the filter is applied to the input image by direct summation. In another embodiment, a digital image is input into an image processor that executes a Fourier transform to produce a Fourier-transformed signal. The curvature-preserving filter is applied to the Fourier-transformed signal in Fourier space to produce a denoised signal, then the denoised signal is transformed by an inverse Fourier transform to generate a denoised output image In an alternate embodiment, the filter further produces a deblurred signal by including an inverse point-response function.

14 Claims, 12 Drawing Sheets

OTHER PUBLICATIONS

Tschumperle D. 2006b. "Fast Anisotropic Smoothing of Multivalued Images Using Curvature-Preserving PDE's", Intl. J. Compu. Vision, 68:65-82.

EPO Search Report in European Application No. 07797750.2 issued Nov. 20, 2009.

Tzong-Jer et al.Chen. A Blurring Index for Medical Images, Journal of Digital Imaging, The Journal of the Society for Computer Applications in Radiology, Springer-Verlag, NE, vol. 19, No. 2, Nov. 14, 2005, pp. 118-125, XP019388023 ISSN: 1618-727X.

* cited by examiner

FILTERS FOR DENOISING DIGITAL IMAGES WITH MINIMIZED BLUR AND SHAPE DISTORTION AND CONTROLLED DEBLURRING

RELATED APPLICATIONS

This application claims the priority of U.S. Provisional Application No. 60/808,439, filed May 24, 2006, which is incorporated herein by reference in its entirety.

FIELD OF THE INVENTION

The present invention relates to a method for reconstruction of digital images by removing noise while minimizing blur and shape distortion.

BACKGROUND OF THE INVENTION

Data collected from sensors are always degraded by physical blur and noise to some extent—it is impossible to build imaging instruments that produce arbitrarily sharp images uncorrupted by measurement noise. Digital image reconstruction is increasingly being used to enhance images by removing noise and blur. The role of digital image reconstruction, performed by software, hardware or a combination thereof, is to process the raw input data so that the resultant images provide the best possible approximation of the true underlying images. The reconstructed images are then presented to viewers or to machine image analysis tools in order to extract the information of interest. Image reconstruction therefore reveals information which is present, but may be hidden in the raw data by blur and noise. In image reconstruction, the main challenge is to prevent measurement errors in the input data from being amplified to unacceptable artifacts in the reconstructed image.

In many existing approaches to image reconstruction, images are deblurred and denoised by replacing the image intensities in pixels by weighted averages of intensities in neighboring pixels. Noise is reduced if the weights are all positive, because positive noise fluctuations cancel negative ones. But this also causes the signals in the pixels to be averaged, which results in added blur. This reconstruction bias can be mitigated by using a mix of positive and negative weights. Such a combination of positive and negative weights can also be used to undo the physical blur inherent in the raw data. However, weights of mixed signs can also amplify the noise, sometimes very significantly. The goal of image reconstruction, therefore, is to find the optimal weighting scheme, which maximizes noise reduction while minimizing the bias caused by signal averaging. If possible, image reconstruction should also reduce the original physical blur to the extent possible.

The bias introduced by signal averaging can be assessed by expanding the signal in a Taylor series around a pixel. To be specific, a two-dimensional example is described herein, but the formulation can be generalized trivially to any dimensionality. Let (x, y) be the position of a reference pixel that is to be denoised. The signal in the neighborhood of (x,y) can be expanded as $$I(x+r, y+s) = I_0 + \frac{\partial I}{\partial x}\bigg|_0 r + \frac{\partial I}{\partial y}\bigg|_0 s + \frac{1}{2}\frac{\partial^2 I}{\partial x^2}\bigg|_0 r^2 + \frac{\partial^2 I}{\partial x \partial y}\bigg|_0 rs + \frac{1}{2}\frac{\partial^2 I}{\partial y^2}\bigg|_0 s^2 + \ldots \quad (1)$$

where the subscript 0 designates the value at the reference point (x,y), r is the displacement from x, and s is the displacement from y. The first derivatives of I are the components of the image gradient, and the second derivatives are the components of the curvature matrix. Additional terms in the Taylor expansion—not shown explicitly—include higher order polynomials in r and s with coefficients that are higher partial derivative tensors of I at (x, y).

Signal averaging is achieved by multiplying I(x+r, y+s) by a filter g(r,s) and integrating over r and s. The result is the averaged signal $$J(x, y) = \int I(x+r, y+s) g(r, s) dr ds \quad (2)$$

$$= I_0 \mu^{(0)} + \frac{\partial I}{\partial x}\bigg|_0 \mu_x^{(1)} \frac{\partial I}{\partial y}\bigg|_0 \mu_y^{(1)} + \frac{1}{2}\frac{\partial^2 I}{\partial x^2}\bigg|_0 \mu_{xx}^{(2)} + \frac{\partial^2 I}{\partial x \partial y}\bigg|_0 \mu_{xy}^{(2)} + \frac{1}{2}\frac{\partial^2 I}{\partial y^2}\bigg|_0 \mu_{yy}^{(2)} + \ldots$$

Here $\mu^{(0)}$, $\mu^{(1)}$ and $\mu^{(2)}$ are the zeroth, first and second moments of g, respectively:

$$\mu^{(0)} = \int g(r,s) dr ds, \quad (3)$$

$$\mu_u^{(1)} = \int u g(r,s) dr ds, \quad (4)$$

$$\mu_{uv}^{(2)} = \int uv g(r,s) dr ds, \quad (5)$$

where u and v correspond to r or s as appropriate.

By convention, the filter is normalized to unit integral and zero mean, so $$\mu^{(0)} = 1, \quad (6)$$

$$\mu^{(1)} = 0, \quad (7)$$

and the second moment becomes the covariance matrix of the smoothing filter $$V_{uv} = \int (u - \mu_u^{(1)})(v - \mu_v^{(1)}) g(r,s) dr ds = \mu_{uv}^{(2)}. \quad (8)$$

By plugging Equations 6-8 into Equation 2, it becomes clear that the leading term contributing to the bias introduced by the filter is due to the sum of the products of the components of the Hessian curvature matrix of the image and the covariance matrix of the filter.

$$J - I = \frac{1}{2}\frac{\partial^2 I}{\partial x^2}\bigg|_0 V_{xx} + \frac{\partial^2 I}{\partial x \partial y}\bigg|_0 V_{xy} + \frac{1}{2}\frac{\partial^2 I}{\partial y^2}\bigg|_0 V_{yy} + \ldots \quad (9)$$

The same arguments that lead to Equation 9 can be applied to the gradients and higher derivatives of the image. The leading term in the bias is due to a sum of products of the components of derivative tensors of the image with the covariance matrix of the filter. The filter is therefore also responsible for distorting the shape of the image.

The relationship between the denoised image J, the image I and the filter g is a convolution (Equation 2). It is therefore useful to take advantage of the convolution theorem to express the relationship as a simple product in Fourier space.

$$\tilde{J}(k) = \tilde{I}(k) \tilde{g}(k), \quad (10)$$

where k is the vector wave number in Fourier space.

Noise is conveniently expressed in terms of its power spectrum in Fourier space. Denoising, therefore, results in a wave-number by wave-number attenuation of the amplitude of the noise by the noise-reduction factor $$NRF = |\tilde{g}(k)| \quad (11)$$

For example, for a Gaussian filter $$\tilde{g}(k)=\exp(-\sigma^2 k^2/2), \quad (12)$$

where $k=|k|$ is the length of the wave-number vector and $\sigma$ is the standard deviation of the filter, which is related to its full width at half maximum by $$FWHM=\sqrt{8\ln 2}\sigma \approx 2.35\sigma \quad (13)$$

In general, filters transmit the lower wave numbers (longer wavelengths) and attenuate the high wave numbers, which replaces the image intensity in each pixel with a weighted average over the image intensities in its neighborhood. The details of the weighting scheme depend on the filter, but the qualitative behavior is to transmit the lower wave numbers and attenuate the high wave numbers. The transition from the low k to the high k regimes should also be smooth, in order to avoid oscillatory behavior due to the Gibbs phenomenon.

"Deblurring" is the process by which one attempts to undo any physical blur caused by the optical system or by the intervening medium between the source of the image and the detector. Blur also often takes the form of a convolution, in this case between the underlying true image and a point-response function, which is the image that a point source extends on the focal plane. In Fourier space, the blurred image is a product of the true image and the point-response function $$\tilde{B}(k)=\tilde{I}(k)\tilde{p}(k), \quad (14)$$

and the deblurred image can be written as a filtering with the inverse point-response function $$\tilde{I}(k)=\tilde{B}(k)/\tilde{p}(k). \quad (15)$$

Unfortunately, this process amplifies noise because $\tilde{p}(k)$ is small at high wave numbers, and dividing by it magnifies the noise component of $\tilde{B}(k)$. For example, for a Gaussian point-response function (PRF)

$$1/\tilde{p}(k)=\exp(+\sigma^2 k^2/2) \quad (16)$$

which grows exponentially with wave number k.

The point-response function is determined by the physics of the optical system and the intervening medium. It is therefore not possible to modify the inverse point-response function. The only freedom available in image reconstruction is to modify the denoising filter.

The reconstruction method need not be an explicit Fourier technique, and it may also apply different degrees of denoising in different parts of the image, but the same principles apply. At the base of all image reconstruction methods is a selection of an explicit or implicit denoising scheme to either reduce the initial noise in the image and/or to suppress the noise amplification resulting from deblurring.

Tschumperlé, in his papers "Curvature-Preserving Regularization of Multivalued Images Using PDE's" (in *European Conference on Computer Vision, Part II*, Leonardis A, Bischof H, Pinz A (eds.), LNCS 3952:295-307, 2006) and "Fast Anisotropic Smoothing of Multivalued Images Using Curvature-Preserving PDE's" (*Intl. J. Compu. Vision,* 68:65-82, 2006) has recently proposed using partial differential equations to effect curvature-preserving regularization of images. This approach uses nonlinear, anisotropic smoothing using a vector or tensor field defined on the image, which preserves image curvature along curves defined by the vector or tensor fields. Tschumperlé uses the term "curvature" to mean a different quantity than the Hessian curvature matrix referred to herein. Also, this approach requires nonlinearity and anisotropy, while the curvature-preserving filters described herein can, and often will, be both linear and isotropic.

The more sophisticated reconstruction methods are, in general, iterative and therefore slower. The preference for iterative methods is due to the deficiencies of noniterative methods. Where noniterative methods suppress noise, they blur images; where they deblur, they amplify the noise in images. Puetter, Gosnell & Yahil (2005, *Annu. Rev. Astron. Astrophys,* 43:139-194), which is incorporated herein by reference, provides a comprehensive review of digital image reconstruction.

In the final analysis, digital image reconstruction is a tradeoff between competing effects, and the choice of the optimal reconstruction method depends on the goals of the user. It is therefore not possible to evaluate the adequacy of prior art without specifying the user's goals. For example, reconstruction of a still image makes fewer demands on image reconstruction processes compared to rapid processing of video in real time.

SUMMARY OF THE INVENTION

It is an object of the present invention to provide curvature-preserving filters (CPFs) for denoising and controlled deblurring of images of any dimensionality.

Still another object of the invention is provide a means for denoising images while minimizing the blur and shape distortion normally caused by denoising filters.

It is another object of the invention to provide a method for image reconstruction that avoids the bias caused by the Hessian curvature matrix of the image when the filter has a nonzero covariance matrix.

The present invention comprises curvature-preserving filters (CPFs) for denoising and controlled deblurring of images of any dimensionality. According to the present invention, denoising filters are provided which transmit Fourier components with low wave number (k), suppress components with high k, change smoothly between the two k regimes, and minimize the denoising bias.

Controlled deblurring to undo any physical blur present in the images can also be added to the denoising filter with minimal increase in noise. When combined, the denoising and deblurring capabilities of the CPFs make them important additions to the technology of digital image reconstruction.

In one aspect of the invention, a digital image comprising a plurality of data units (pixel, voxels, or some other measure) is input into an image processor that executes a Fourier transform to produce a Fourier-transformed signal comprising complex intensities as functions of vector wave-number coordinates in Fourier space. A curvature-preserving filter with a null covariance matrix is applied to the Fourier-transformed signal to produce a denoised signal The denoised signal is transformed by an inverse Fourier transform to generate a denoised output image for output to a graphic display device or to a machine analysis tool, such as an image recognition system. In an alternate embodiment, the filter further produces a deblurred signal by including the inverse of the point-response function.

In another aspect of the invention, the filter is a small kernel with a null covariance matrix, which extends over a limited number of pixels and is applied to the input image by direct summation without recourse to Fourier and inverse-Fourier transformations.

In a first embodiment, the filter comprises software stored within a computer that also executes the image processor. In a second embodiment, the image processor and filter comprise one or more field-programmable gate arrays or application-specific integrated circuits, which process raster video in real time.

BRIEF DESCRIPTION OF THE DRAWINGS

The present invention will be better understood from the following detailed description of some preferred embodiments of the invention, taken in conjunction with the accompanying drawings, in which like numbers correspond to like parts, and in which.

DETAILED DESCRIPTION OF THE INVENTION

Figure 1:
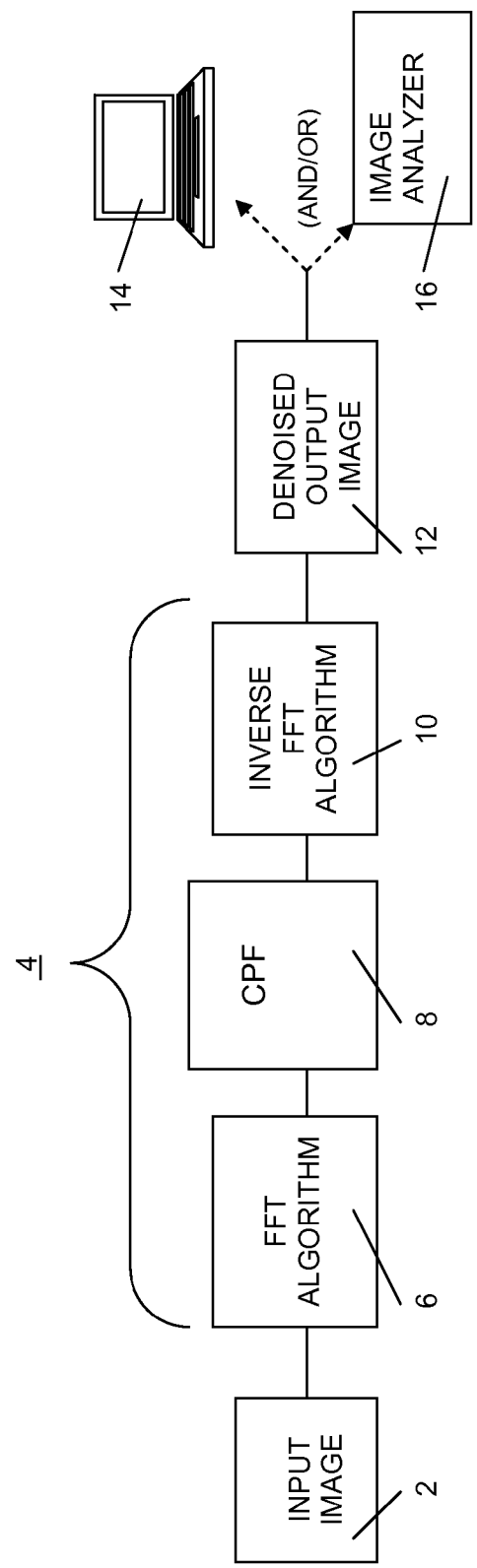
FIG. 1 is a block diagram of the components of an image processor implemented using a central processing unit, a microprocessor or a digital signal processor for image reconstruction according to the present invention.

As illustrated in FIG. 1, a digital image 2, for example, a medical image, a photograph, a frame of a video, or a signal from a detector array, is input into an image processor 4 that executes a Fourier transform algorithm 6 to produce a Fourier-transformed signal comprising complex image intensities in Fourier space. A filter 8 is applied to the Fourier-transformed signal to produce a denoised signal, where the filter has a null covariance matrix. The denoised signal is transformed by an inverse Fourier transform 10 to generate a denoised output image 12 for output to an output device, which may be a graphic display 14, such as a computer monitor at a user interface, a television screen or a printer, and/or an image analyzer 16. Possible image analyzers include image recognition or computer-aided diagnosis (CAD) systems. In an alternate embodiment, the filter 8 further produces a deblurred signal by including the inverse of the point-response function. In a first embodiment, as illustrated in FIG. 1, the filter 8 comprises software stored within an image processor that is executed using a central processing unit, a microprocessor or a digital signal processor. In a second embodiment, the image processor and filter comprise one or more field-programmable gate arrays or application-specific integrated circuits. Where the filter is implemented using one or more FPGAs or ASICs, as would be the preferred case for real time processing of raster video, application of the filter in Fourier space is not necessary, such that steps 6 and 10 shown in FIG. 1 would be omitted and processor 4 would be the FPGA or ASIC that implements filter 8.

According to the present invention, denoising can be achieved by use of a simple filter, which satisfies all the above criteria and has the Fourier representation $$\tilde{g}(k) = \exp(-a^4 k^4), \quad (17)$$

where a is a scale length, which determines the width of the filter. The main advantage of filter 8 is its null covariance matrix, which results from the fact that the second derivatives of $\tilde{g}$ all vanish at k=0.

$$V_{uv} = \frac{\partial^2 \tilde{g}}{\partial k_u \partial k_v}\bigg|_{k=0} = 0. \quad (18)$$

As a result, the leading term in the denoising bias is zero (Equation 9). Smoothing with this filter therefore preserves the curvature of the image.

All of the odd and anisotropic moments of the filter are also zero, because the filter is only a function of the magnitude k of the vector wave number but not its direction. The first nonzero moment is therefore the isotropic part of the fourth moment $\mu^{(4)}$, and it is the first term to contribute to the denoising bias.

The CPF does have a small Gibbs oscillation in image space as a consequence of the null covariance matrix. (The filter must be both positive and negative, so that the second moments can vanish.) The negative dip of the filter, however, is very modest. The ratio of (negative) minimum to (positive) maximum of the filter is −0.06.

An added benefit of the CPF of Equation 17 is that attenuation at large k with the negative exponent proportional to $k^4$. This strong attenuation overcomes the exponential growth of typical inverse point-response functions, whose positive exponents are typically only proportional to $k^2$. For example, for a Gaussian point-response function whose inverse grows exponentially (Equation 16), the result is that the combined deblurring and denoising filter is well behaved.

$$\tilde{g}(k)/\tilde{p}(k) = \exp\left(\frac{1}{2}\sigma^2 k^2 - a^4 k^4\right) \quad (19)$$

Deblurring can therefore be added without a problem to the CPF.

CPFs can be implemented using either software or hardware, or a combination thereof. Software processing is most easily performed by application of the Fourier convolution theorem. The Fourier-transformed input signal $\tilde{I}(k)$ is first obtained using a fast-Fourier-transform (FFT) algorithm. The Fourier-transformed output signal $\tilde{J}(k)$ is then obtained by multiplying the Fourier-transformed input signal by the filter of Equation 10. For pure denoising, the filter to use is $\tilde{g}(k)$ (Equation 17). To perform both denoising and deblurring, the filter $\tilde{g}(k)/\tilde{p}(k)$ of Equation 19 is used instead. Finally, the output signal is obtained by an inverse fast Fourier transform of $\tilde{J}(k)$.

Fast Fourier transforms perform convolutions very efficiently when used on standard desktop computers, i.e., one or more CPUs, memories and interfaces such as a PC or Apple® Macintosh®, however, they require the full data frame to be collected before the computation can begin. This is a significant disadvantage when processing raster video in pipeline fashion as it comes in, because the time to collect an entire data frame often exceeds the computation time. Pipeline convolution of raster data streams is more efficiently performed by massively parallel direct summation techniques, even when the kernel covers as much as a few percent of the area of the frame. In hardware terms, a field-programmable gate array (FPGA) or an application-specific integrated circuit (ASIC) can be much more efficient than a digital signal processor (DSP) or a microprocessor unit (MPU), since the latter processors require the full data frame to be collected. Commercially available FPGAs or ASICs can be fabricated to perform small-kernel convolutions faster than the rate at which raster video can directly feed them, e.g., at a rate of up to ~150 megapixels per second using current technologies.

A curvature-preserving small kernel can be designed in a variety of ways, the only requirement being that it have a null covariance matrix. One way is to obtain the inverse Fourier transforms of the filters in Equations 17 or 19. These kernels do not extend significantly beyond the scale length a (defined in Equation 17). They can therefore safely be truncated at a few scale lengths and can then be used in hardware-based small-kernel convolution.

Figure 2:
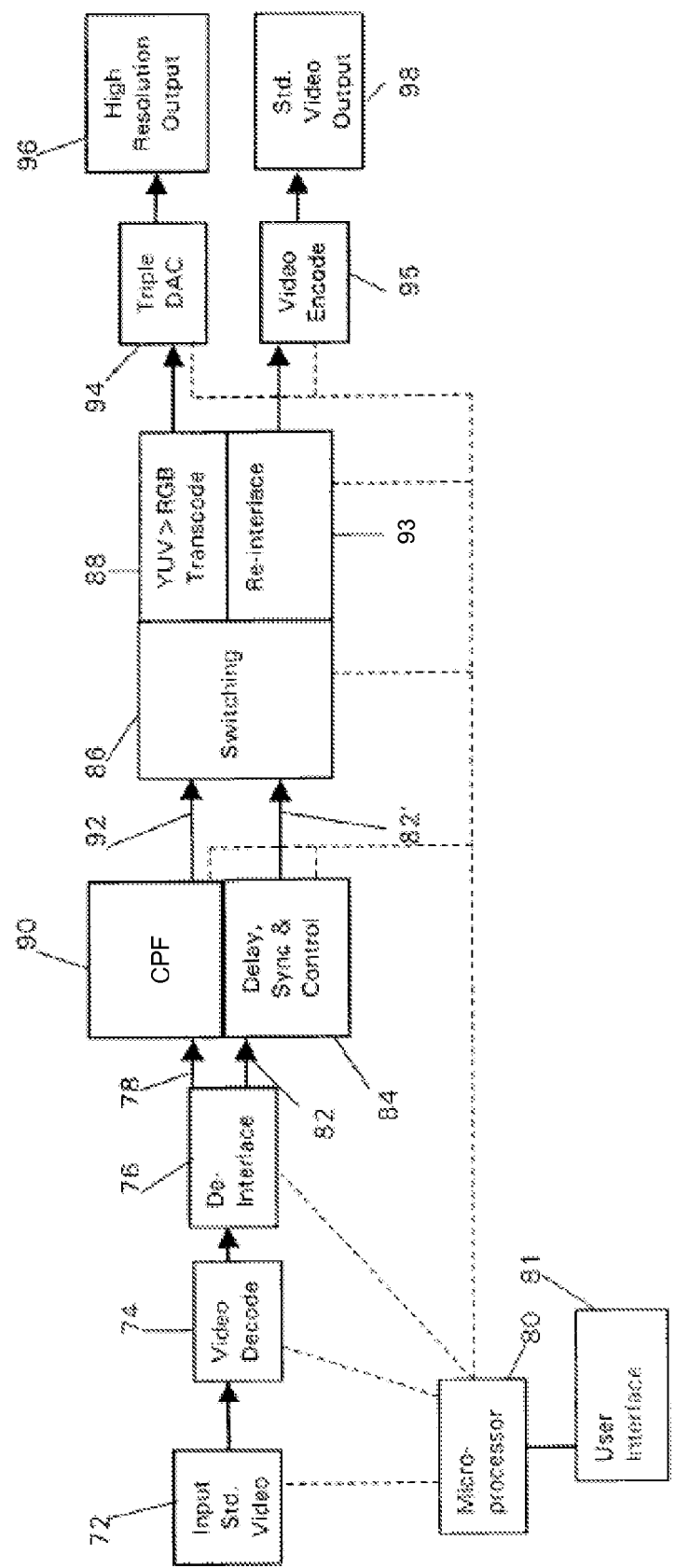
FIG. 2 is a block diagram of the steps for processing a video stream according to the present invention.

An exemplary application of the present invention to a video input is illustrated in FIG. 2, where a standard NTSC (National Television Standards Committee) video stream provides the input signal 72. Under the control of microprocessor 80, which controls all modules in the image processing system (as indicated by the dashed lines), the video is decoded 74 and deinterlaced 76 to provide a high-resolution image every sixtieth of a second. If the video signal includes color, it is split into its luminance (Y) 78 and chrominance (UV) 82 components. Using one or more field programmable gate arrays (FPGAs) under microprocessor control, the luminance component of the signal is processed according to the above-described procedure, in which the luminance data is convolved by the small-kernel filter 90 to produce a transformed input signal 92 which is denoised (or denoised and deblurred).

The chrominance signal 82 is passed forward through the hardware without processing, but appropriately delayed at 84 to provide signal 82' which is synchronized with the processed luminance signal 92. The luminance 92 and chrominance 82' signals are merged and switched at 86 for input to two separate output channels. In the first channel 88, the luminance and chrominance signals are converted into an RGB signal, which is passed to a triple digital-to-analog converter (DAC) 94 and output to a high resolution monitor 96, such as an SVGA monitor. The second channel is a NTSC or PAL standard output channel 98. For the latter, the signals are reinterlaced 93 prior to encoding for NTSC or PAL video output 95.

In an alternate embodiment, the de-interlacing process 76 is omitted and the interlaced signals are processed separately. In this embodiment, some loss of vertical resolution may occur in exchange for elimination of delay introduced by the input deinterlacer. In this case, the re-interlacing step 92 for standard video output can also be eliminated.

In yet another embodiment, the input video signal is progressive and the deinterlacing process 76 may not be applied and is therefore omitted. In this case, the lack of de-interlacing does not cause loss of vertical resolution.

Figure 3:
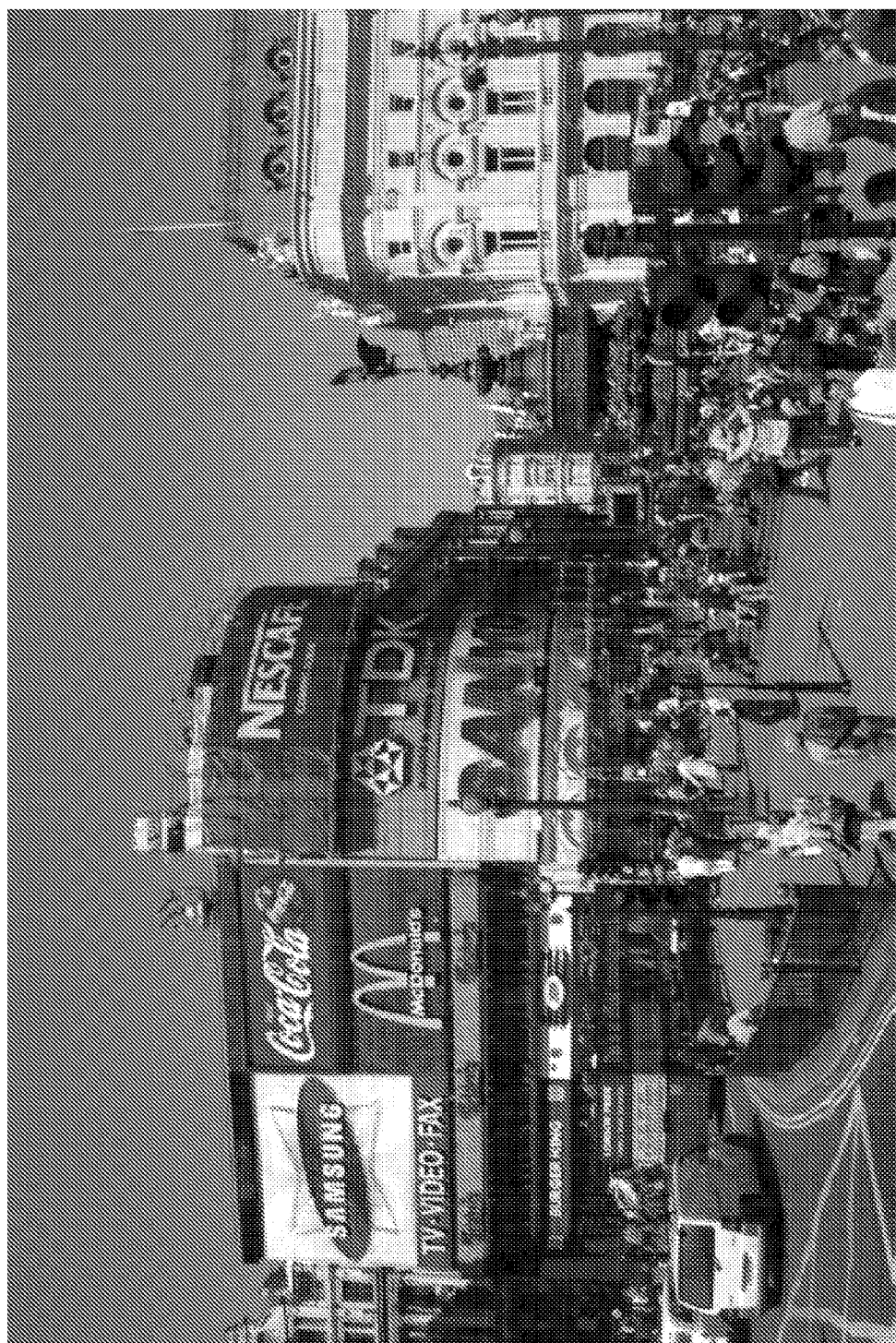
FIG. 3 is a truth image upon which further processing is performed.

The following examples describe both denoising and deblurring of a photographic image of Piccadilly Circus in London. FIG. 3 provides the "truth image", which is the basis for the simulations and reconstructions to follow. This image was originally a full color (RGB) image but was converted to grayscale for the present description.

Example 1

Denoising

Figure 4A:
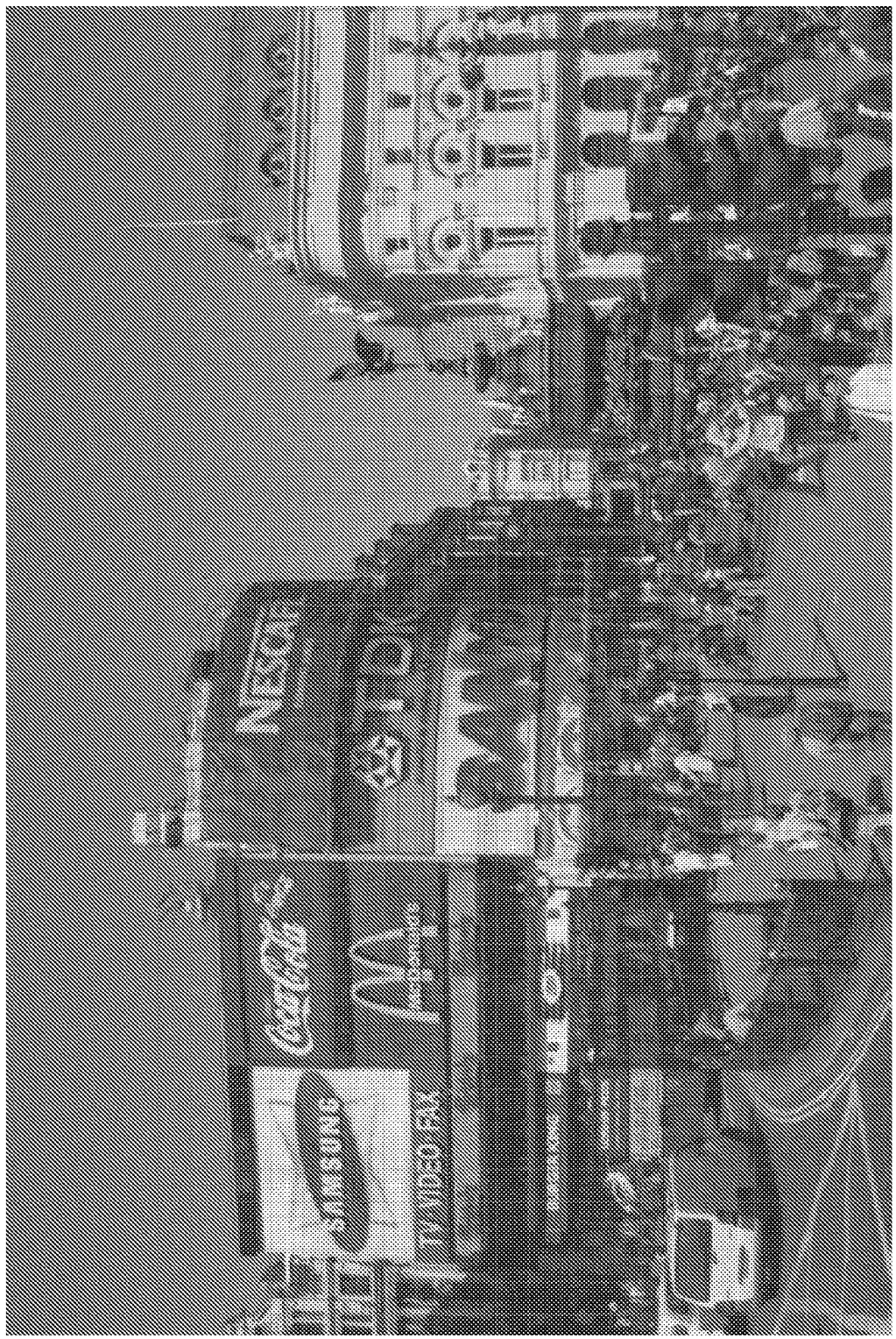
FIGS. 4a-4c are variations of the image of FIG. 3, where 4a shows the image with added noise; 4b shows the image after denoising with a CPF; and 4c shows the image after denoising with a prior art Gaussian filter.

In the first simulation, only noise is added to the truth image, and there is no blurring. The range of the RGB intensities of the original image is [0,255], and the noise level added is 255/20=12.75. The maximum signal-to-noise ratio is therefore 20. The noisy data image is shown in FIG. 4a and is the input to the reconstruction.

Figure 4B:
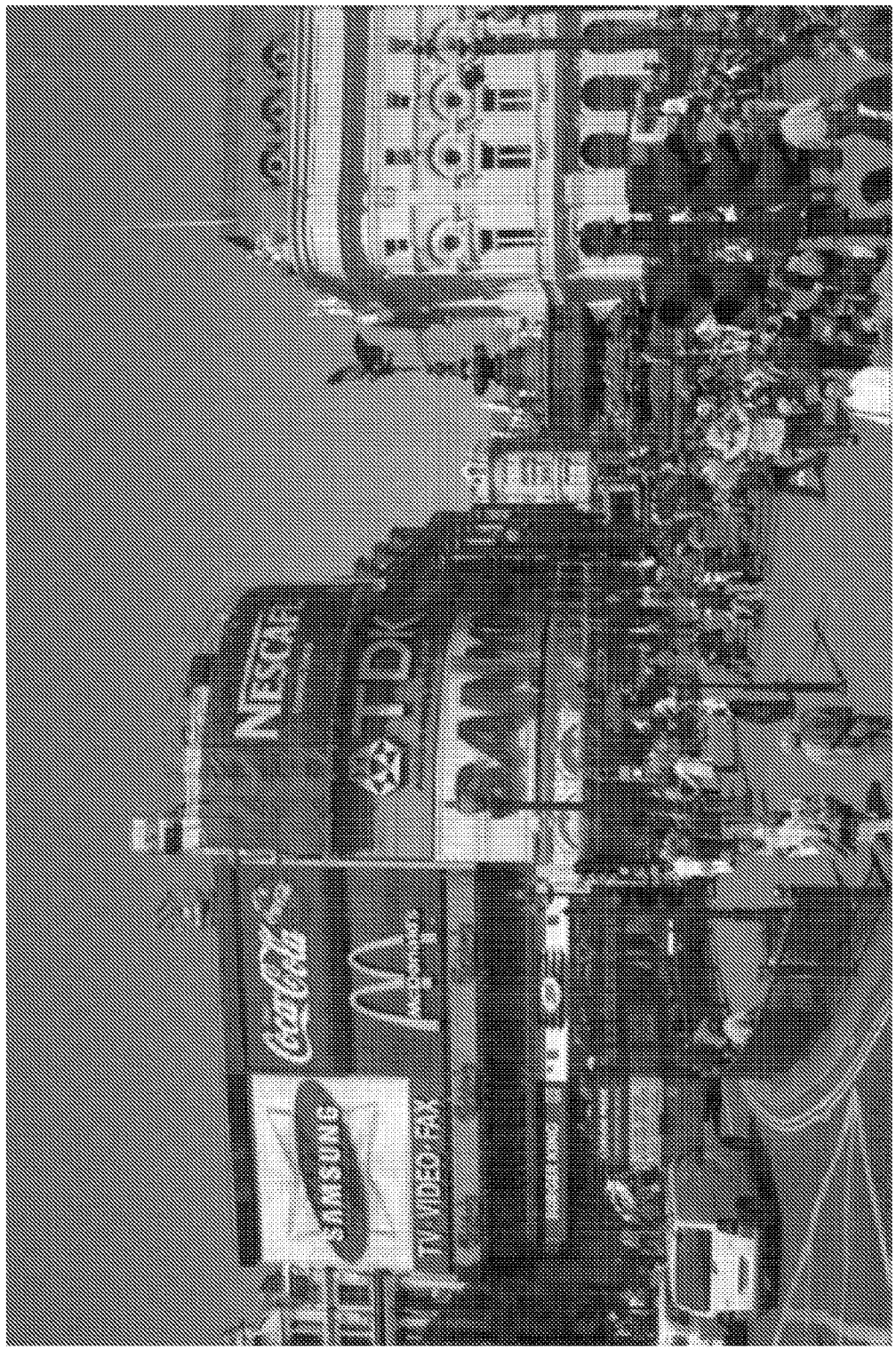
Figure 4C:
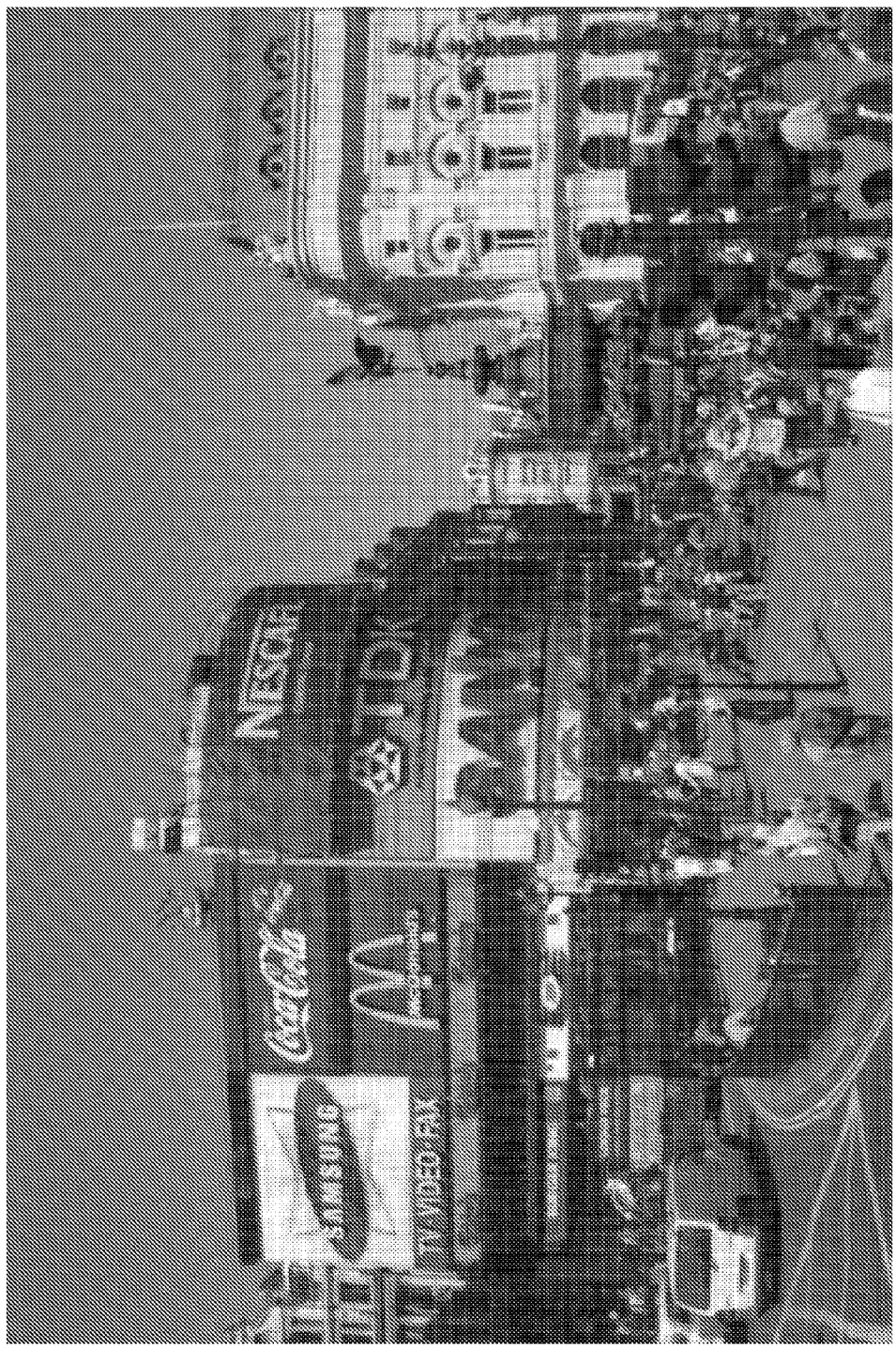

The result of applying a CPF with a scale length a=2 pixels is shown in FIG. 4b, and may be compared with FIG. 4c, which shows the result of smoothing with a Gaussian filter with a full-width at half maximum of 1.77 pixels. This Gaussian filter has the same denoising strength as the CPF, where the denoising strength is measured by the sum of the squares of the smoothing weights of all pixels, normalized so that the sum of the weights is one.

The quality of the two reconstructions can be compared by inspecting the difference images between the reconstructions and the truth image, where the residual signal indicates how much of the original image was given up to bias during the reconstruction. In a comparison of the two differences (truth−CPF) and (truth−Gaussian filter) (not shown), the CPF residual is much less than that of the Gaussian filter, which means the CPF has smaller bias than the Gaussian filter.

Example 2

Deblurring and Denoising

Figure 5A:
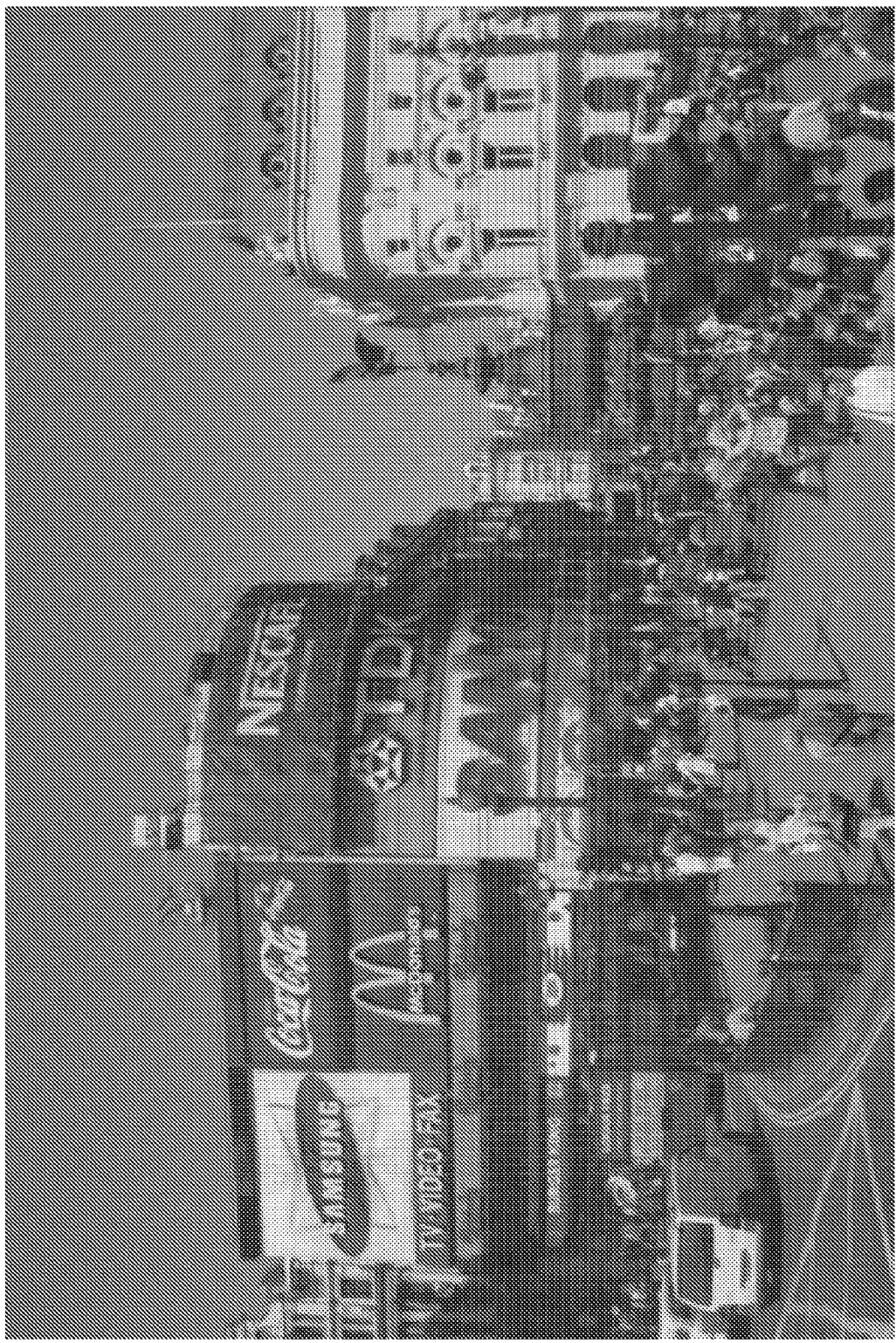
FIGS. 5a-5c are variations of the image of FIG. 3, where 5a shows the image with added noise and blur; 5b shows the image after denoising and deblurring with a CPF; and 5c shows the image after processing with a prior art Gaussian filter.

In the second simulation, the truth image of FIG. 3 is first blurred by a Gaussian with σ=2 pixels before noise is added as in the first simulation. The raw image input shown in FIG. 5a is therefore both blurred and noisy. The CPF attempts to undo the blurring by including a deblurring term in the filter, Equation 19. The Gaussian filter, on the other hand, is left as in the first reconstruction, because it is not possible to add Gaussian deblurring to it without catastrophic noise amplification. Unlike the CPF, the Gaussian filter is therefore only able to denoise but not to deblur.

Figure 5B:
Figure 5C:
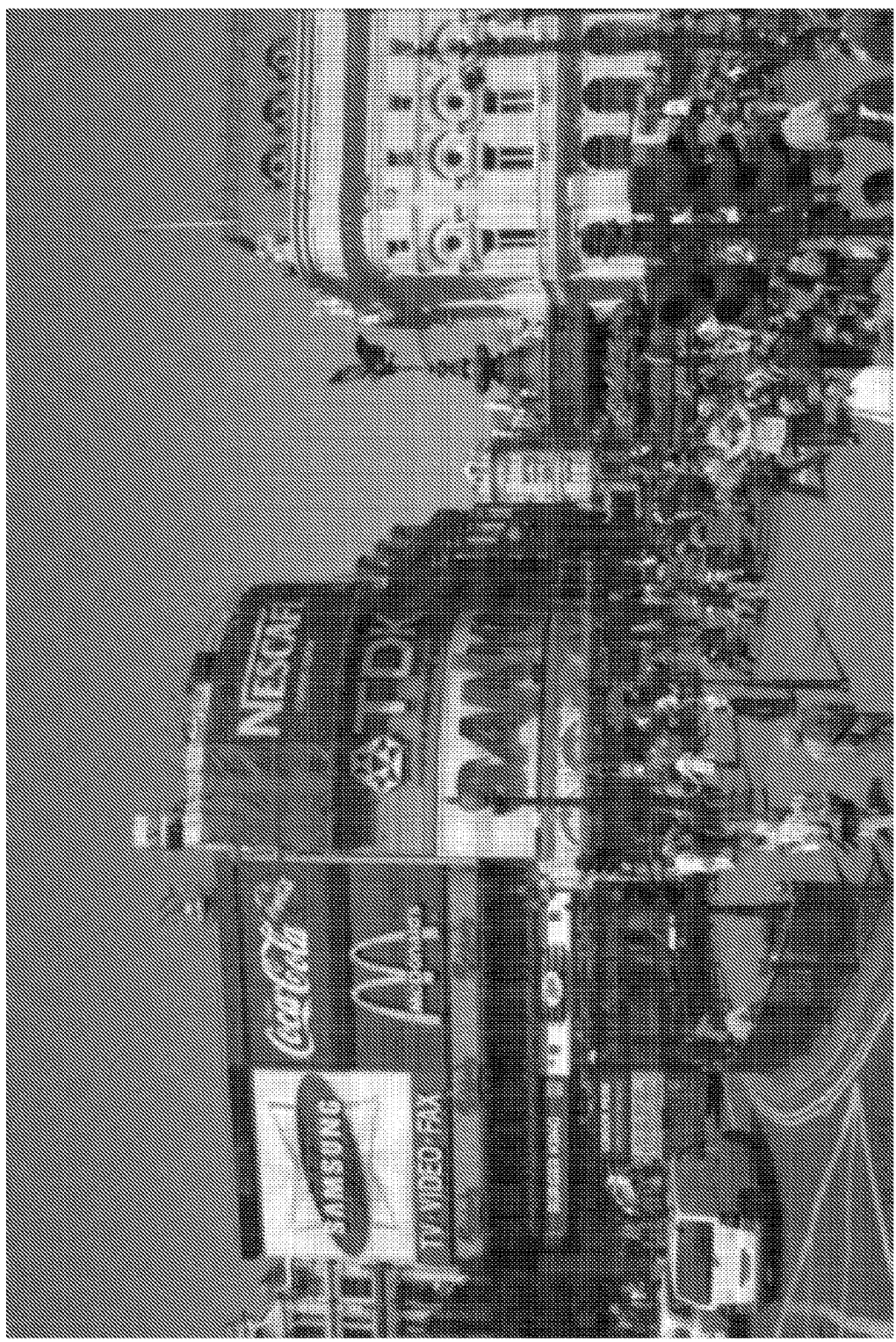

The results of the reconstructions are shown in FIGS. 5b-5c, which are the analogs of FIGS. 4b-4c, with FIG. 5b showing the CPF reconstruction and FIG. 5c showing the Gaussian reconstruction. The CPF again provides better reconstruction than does the Gaussian filter. The importance of deblurring becomes apparent when comparing the results of this example against those of Example 1 (no blur). With the Gaussian filter, the relative residual signals are significantly stronger in the present example compared to those of Example 1, indicating that failure to deblur introduces additional bias. On the other hand, the difference between the residual signals for the CPFs in Example 1 and Example 2 is much smaller. Thus, the ability of the CPF to provide deblurring is a significant bonus.

Example 3

Partial Deblurring and Denoising

Figure 6A:
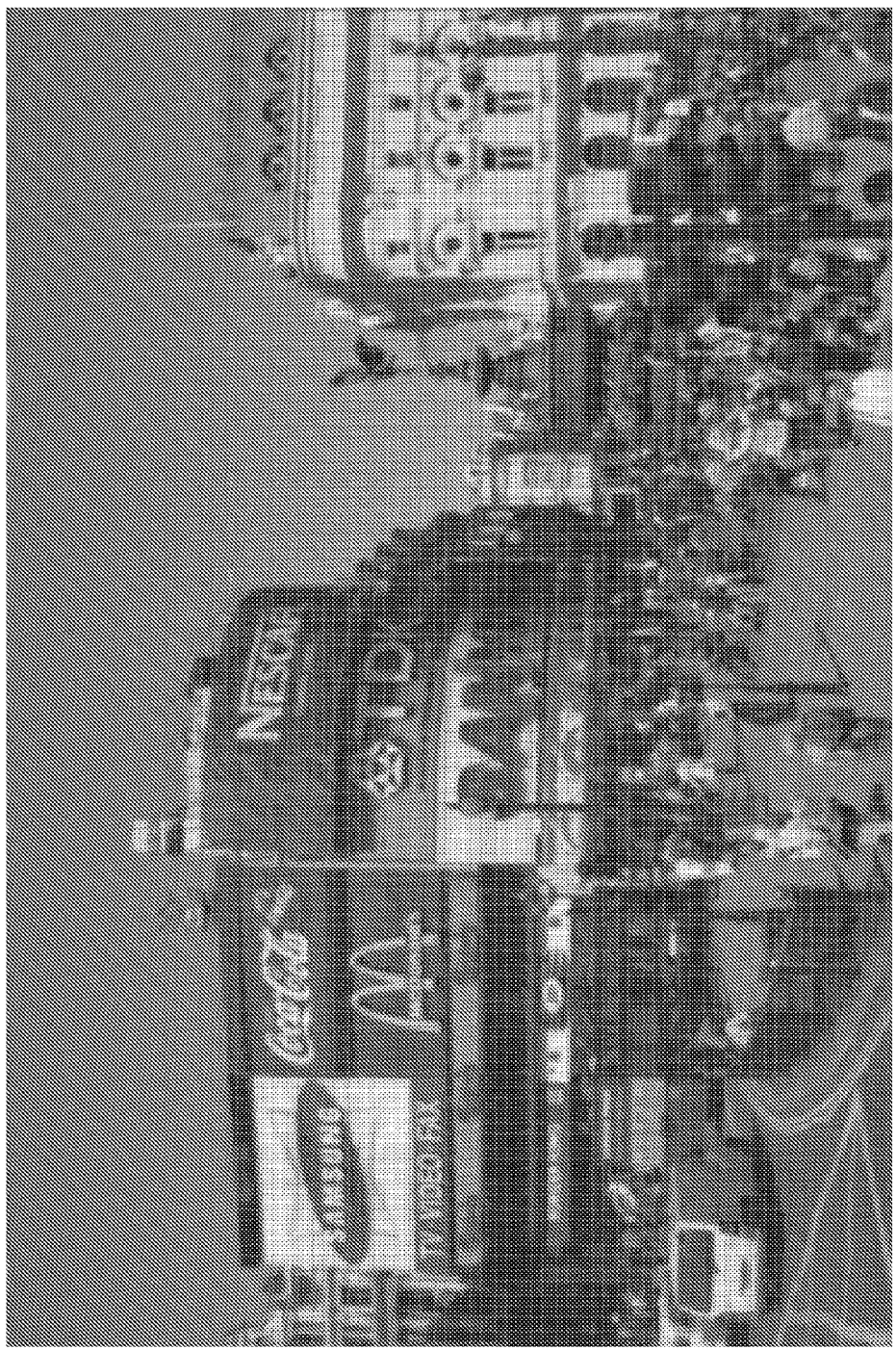
FIGS. 6a-6c are variations of the image of FIG. 3, where 6a shows the image that is blurred and has added noise; 6b shows the image after denoising and partial deblurring with a CPF; and 6c shows the image after processing with a prior art Gaussian filter.

In the third simulation, the truth image in FIG. 3 is first blurred by a wider Gaussian with σ=4 pixels before noise is added as in the first simulation, to yield the raw image shown in FIG. 6a. Again, the CPF attempts to undo the blurring by including a deblurring term in the filter according to Equation 19, while the Gaussian filter can only denoise but not deblur.

Figure 6B:
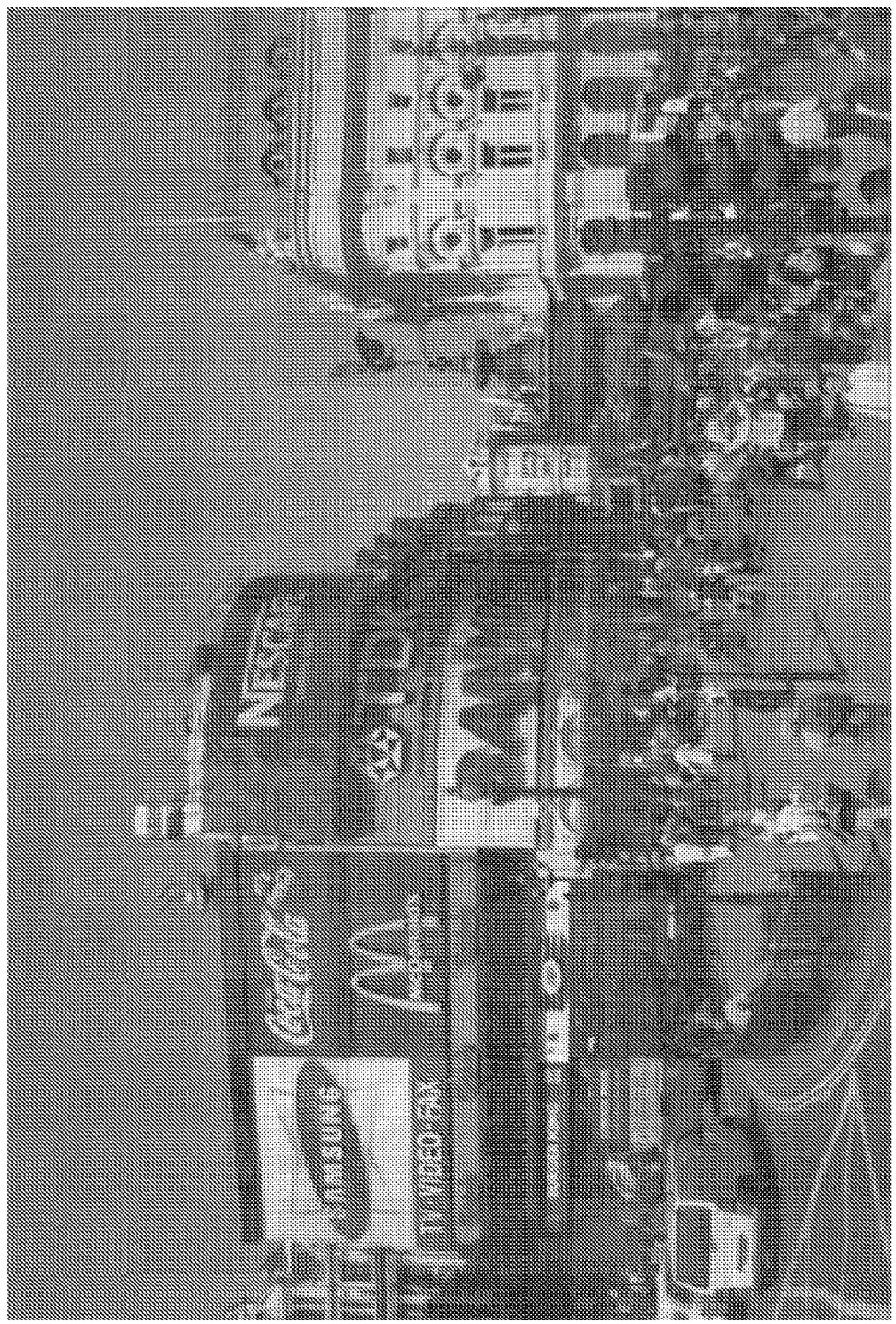
Figure 6C:

The results of the reconstructions are shown in FIGS. 6b-6c, which are analogs of FIGS. 4b-4c and 5b-5c. The CPF again produces a better reconstruction than the Gaussian filter. In this case, however, deblurring is much stronger, and the noise amplification brought about by the exponentially growing $1/\hat{p}(k)$ factor (Equation 16) is not damped as well by the exponentially falling $\tilde{g}(k)$ factor if one uses the same scale length a=2 pixels used in the other reconstructions.

One can trade resolution versus noise by changing the values of σ and a in the filter, Equation 19, to suit the preference of the user. Decreasing σ or increasing a result in less noise amplification at the price of incomplete deblurring. The choice made in the reconstruction shown in FIG. 6b was σ=4 pixels and a=2 pixels.

The inventive filter can be generalized to suit specific needs by using functions of $k^4$ other than the exponential function of Equation 17, or functions of higher, even powers of k. Higher powers of k, however, will tend to increase the amplitude of the Gibbs phenomenon, because such filters have more abrupt transitions from the low-k to the high-k regimes.

The foregoing description of the CPFs was made using 2D images as an illustration. It will be readily apparent to those of skill in the art that analogous arguments may be made for images of any dimensionalities. They can be 3D images, 1D profiles, 1D spectra, or "images" of dimensionality higher than 3, in which the additional dimensions are time, temperature, wavelength, or any number of other variables.

The inventive CPFs can be used by both iterative and noniterative image reconstructions. Their advantage in noniterative methods is their ability to limit the artifacts commonly generated by noniterative techniques. But they can also be employed in iterative techniques in lieu of the filters now in use. CPFs therefore form a complementary new technology. They do not replace existing technologies but simply provide improved filters. The CPFs, however, are expected to tip the tradeoff between image quality and processing speed in favor of the faster noniterative methods by making them more robust and artifact free.

In the preceding detailed description, the invention has been described with reference to specific exemplary embodiments thereof. It will, however, be evident that various modifications and changes may be made thereunto without departing from the broader spirit and scope of the invention as set forth in the appended claims and their full scope of equivalents.

The invention claimed is:

1. A method for reconstructing an image from an image source, comprising:
   inputting a digital image signal comprising a plurality of pixels into an image processing device programmed for executing a curvature-preserving filter, wherein the filter comprises at least zeroth, first and second moments, the second moments comprising a null covariance matrix;
   filtering the image signal by the filter to produce a denoised image; and
   outputting the denoised image to a graphic display device or a machine analysis tool,
   wherein the image processing device comprises a central processing unit, a microprocessor or a digital signal processor having software stored therein for, prior to the step of multiplying, executing a Fourier transform to produce a Fourier-transformed signal comprising vector wave numbers in Fourier space, and after multiplying the image signal by the filter, executing an inverse Fourier transform to produce the denoised image,
   wherein the filter has a Fourier representation comprising $$\tilde{g}(k)/\tilde{p}(k) = \exp\left(\frac{1}{2}\sigma^2 k^2 - a^4 k^4\right),$$

where a is a scale length that determines a width of the filter, k is the vector wave number, k is the magnitude of k, and $\sigma$ is a standard deviation of the point-response function.

2. The method of claim 1, wherein the filter kernel further comprises an inverse point-response function for deblurring.

3. The method of claim 1, wherein the image processing device comprises one or more field-programmable gate arrays or application specific integrated circuits configured to receive a kernel consisting of a small number of pixels, and the filter kernel is applied to the image signal by direct summation.

4. The method of claim 3, wherein the image signal comprises a raster data stream.

5. The method of claim 1, wherein the image signal comprises a full data frame.

6. The method of claim 1, wherein the filter kernel is a function of an even power of a magnitude of the vector wave numbers with power greater or equal to four.

7. The method of claim 1, wherein the filter kernel has a Fourier representation comprising $\tilde{g}(k) = \exp(-a^4 k^4)$, where a is a scale length that determines a width of the filter kernel, k is the vector wave number, and k is a magnitude of k.

8. An image processing device for denoising an input image, the device comprising:
   an input device for receiving the input image and outputting a digital image signal;
   a processor for receiving the image signal, the processor programmed to apply a curvature-preserving filter to the image signal to generate a denoised signal, wherein the filter comprises at least zeroth, first and second moments, the second moments comprising a null covariance matrix;
   an output device for outputting the denoised signal to a graphic display device or a machine analysis tool,
   wherein the image processing device comprises a central processing unit, a microprocessor or a digital signal processor having software stored therein for, prior to the step of multiplying, executing a Fourier transform to produce a Fourier-transformed signal comprising vector wave numbers in Fourier space, and after multiplying the image signal by the filter, executing an inverse Fourier transform to produce the denoised image,
   wherein the filter has a Fourier representation comprising $$\tilde{g}(k)/\tilde{p}(k) = \exp\left(\frac{1}{2}\sigma^2 k^2 - a^4 k^4\right),$$

where a is a scale length that determines a width of the filter, k is the vector wave number, k is the magnitude of k, and $\sigma$ is a standard deviation of the point-response function.

9. The image processing device of claim 8, wherein the filter kernel further comprises an inverse point-response function for deblurring.

10. The image processing device of claim 8, wherein the image processing device comprises one or more field-programmable gate arrays or application specific integrated circuits configured to receive a kernel consisting of a small number of pixels, and the filter kernel is applied to the image signal by direct summation.

11. The image processing device of claim 10, wherein the image signal comprises a raster data stream.

12. The image processing device of claim 8, wherein the image signal comprises a full data frame.

13. The image processing device of claim 8, wherein the filter kernel is a function of an even power of a magnitude of the vector wave numbers with power greater or equal to four.

14. The image processing device of claim 8, wherein the filter kernel has a Fourier representation comprising $\tilde{g}(k) = \exp(-a^4 k^4)$, where a is a scale length that determines a width of the filter kernel, k is the vector wave number, and k is a magnitude of k.

* * * * *